US006536598B2

(12) United States Patent
Furnas

(10) Patent No.: US 6,536,598 B2
(45) Date of Patent: Mar. 25, 2003

(54) GLASS CONTAINER INSPECTION MACHINE

(75) Inventor: William J. Furnas, Elmira, NY (US)

(73) Assignee: Emhart Glass S.A., Cham (CH)

(*) Notice: Subject to any disclaimer, the term of this patent is extended or adjusted under 35 U.S.C. 154(b) by 0 days.

(21) Appl. No.: 09/747,373

(22) Filed: Dec. 21, 2000

(65) Prior Publication Data

US 2002/0082743 A1 Jun. 27, 2002

(51) Int. Cl.[7] ............................ B07C 5/00; H04B 14/04
(52) U.S. Cl. ........................ 209/523; 209/919; 375/242
(58) Field of Search ................................ 209/522, 523, 209/524, 919; 375/240.03, 240.22, 240.28, 242

(56) References Cited

U.S. PATENT DOCUMENTS 4,109,511 A * 8/1978 Powers, Jr. et al. ..... 209/522 X
4,691,496 A * 9/1987 Anderson et al. .............. 53/53
4,958,223 A * 9/1990 Juvinall et al. ............. 358/106
6,296,123 B1 * 10/2001 Zakeri et al. ........... 209/523 X

FOREIGN PATENT DOCUMENTS

EP 356645 * 3/1990 ................. 209/523

* cited by examiner

*Primary Examiner*—Tuan N. Nguyen
(74) *Attorney, Agent, or Firm*—Spencer T. Smith

(57) ABSTRACT

Two data streams which are not related real-time are operated on so that the input stream can be processed real-time vis-a-vis the output stream. Both streams are clocked by the same encoder and a random tracking signal is imposed on both the input and output data streams. A reject signal on the input stream can accordingly be placed at the correct location on the output stream.

3 Claims, 4 Drawing Sheets

GLASS CONTAINER INSPECTION MACHINE

The present invention relates to container inspection machines.

BACKGROUND OF THE INVENTION

When an inspection device inspects an object such as a glass container, there is a fixed period of time in which a specific inspected bottle must be removed from a transporting conveyor by a rejector.

In a real-time computing environment a control, at the time an inspection is made not only knows where the bottle is but knows how long it will take to reach the rejector. Accordingly, when the decision is made that a bottle is to be rejected, the time until rejection will be counted and the rejector than fired to remove the bottle.

In a non-real-time computing environment this continuity does not exist. For example, in a MICROSOFT WINDOWS computing environment, things do not occur at known times. Rather things happen in accordance with preselected priorities.

OBJECT OF THE INVENTION

It is accordingly an object of the present invention to adapt such a system so that it will, in effect, operate real-time.

Other objects and advantages of the present invention will become apparent from the following portion of this specification and from the accompanying drawings, which illustrate in accordance with the mandate of the patent statutes a presently preferred embodiment incorporating the principles of the invention.

BRIEF DESCRIPTION OF THE PREFERRED EMBODIMENT

Figure 1:
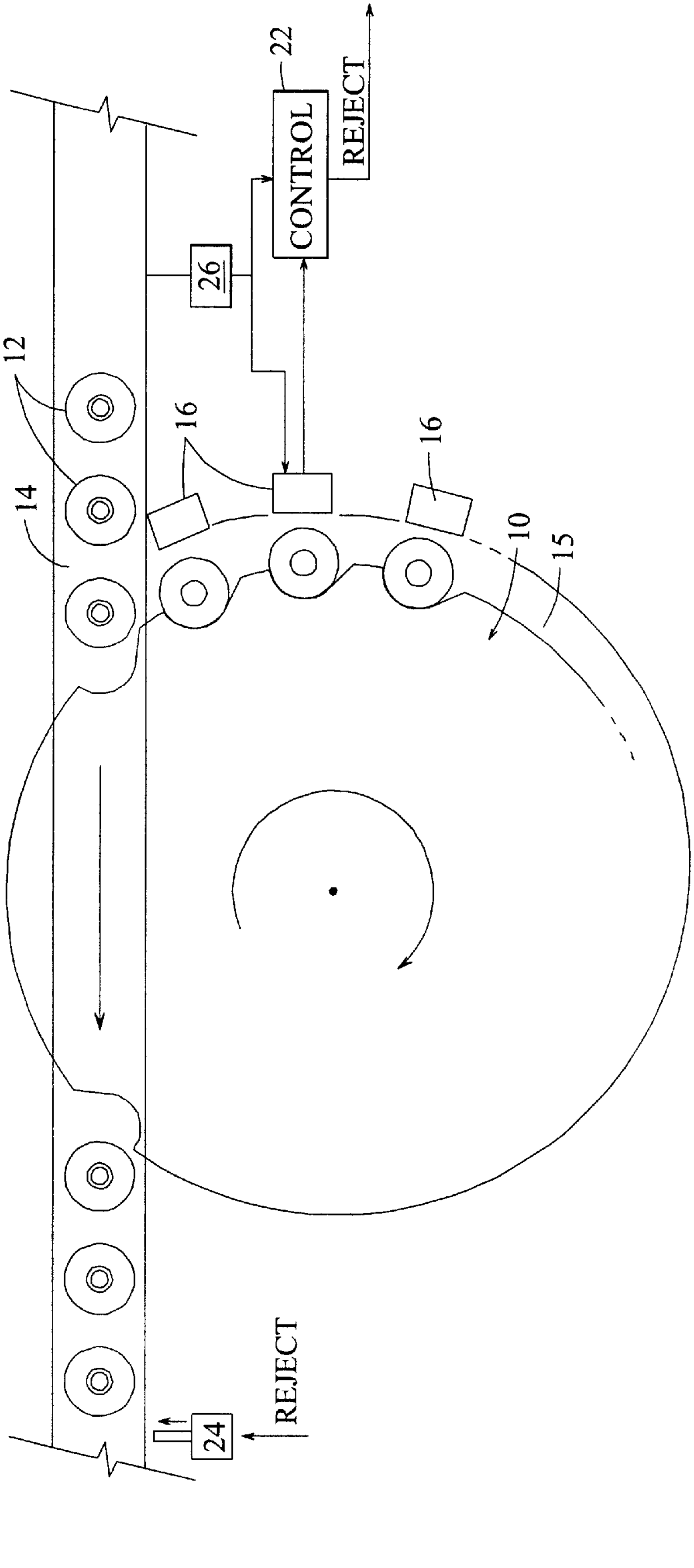
FIG. 1 is a schematic showing of an inspection machine.
Figure 2:
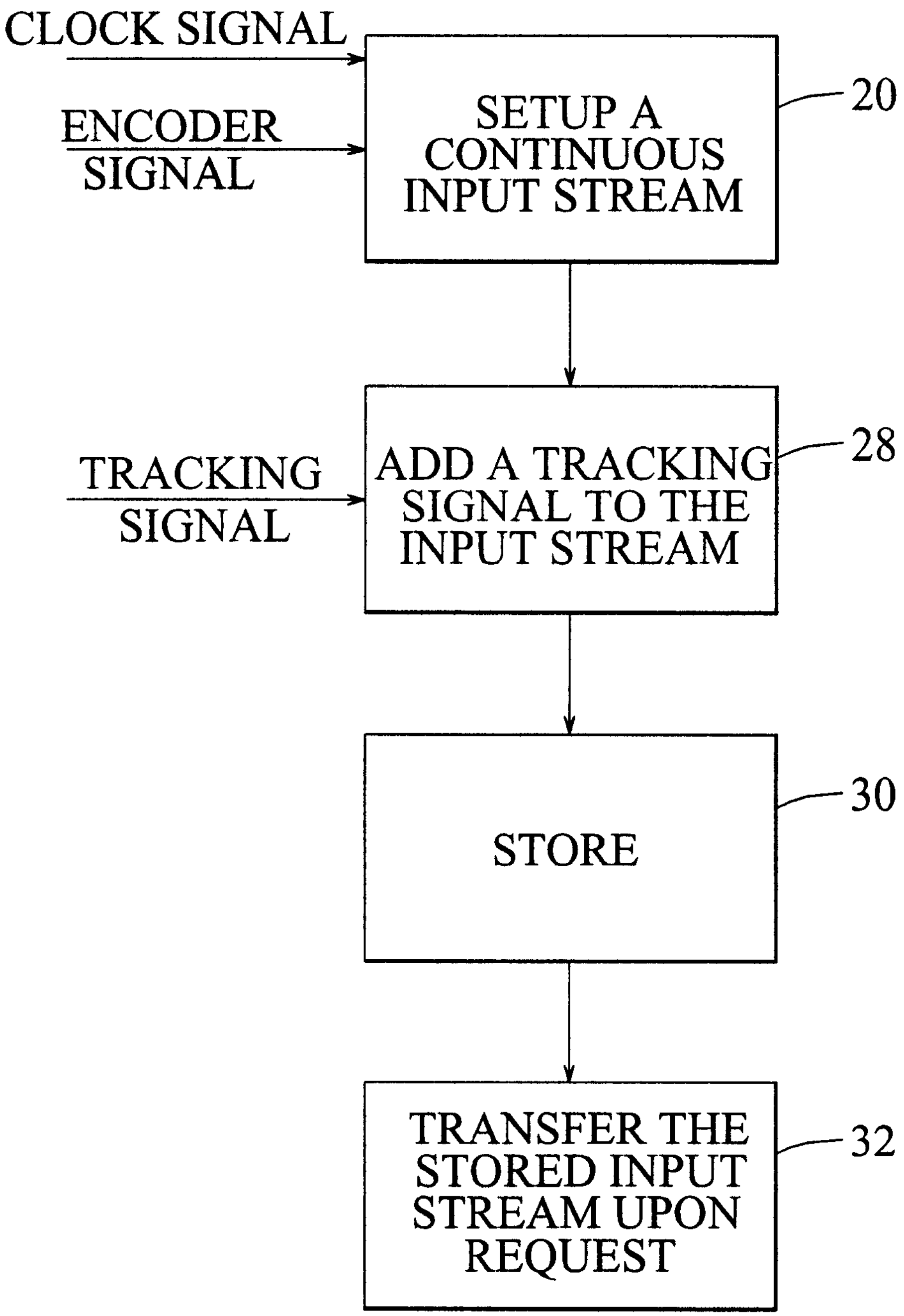
FIG. 2 is a logic diagram for the control of an inspection device.
Figure 3:
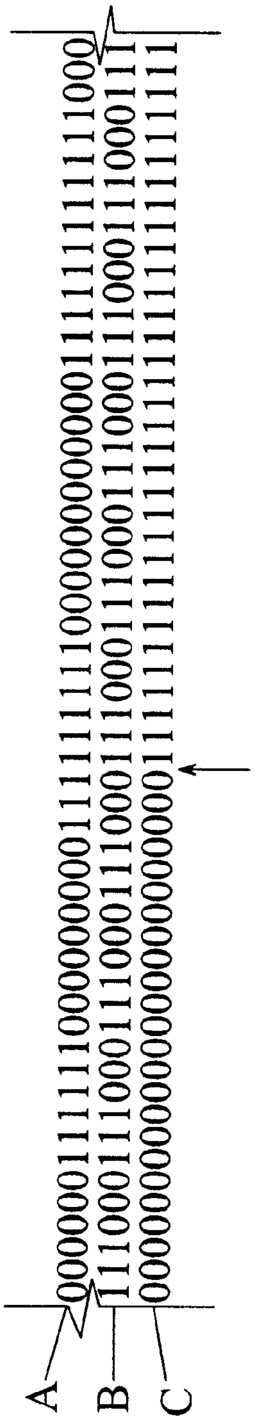
FIG. 3 is schematic illustration of memory receiving an input stream of data from an inspection device.

A glass container inspection machine includes a feeder assembly 10 which is rotatively driven in clockwise angular steps to transfer bottles 12 from a linear conveyor 14 (as shown the conveyor is carrying bottles right to left) onto an annular table 15 where they will be incrementally displaced to a series of inspection stations. Each inspection station will have one or more inspection devices 16 which will Setup A Continuous Input Stream 20 of data (FIG. 2) at a selected frequency (10 KiloHertz, for example). FIG. 3 schematically illustrates the nature of the input stream. The bottom row of data is the output of the inspection device with a "0" indicating that a container has not been rejected and a "1" indicating that a bottle has failed the inspection. The location in the input stream where a transition from "0" to "1" has occurred which indicates that a bottle has been rejected is shown with an arrow. The middle row of data is a clock signal from an encoder 26 and this is defined by successive three "ons" and three "offs". The uppermost row of the input stream is a tracking code. The inspection device receives Add(s) A Tracking Signal To The Input Stream 28, which is defined by successive groups of an identical number of "1"s and "0's having random counts. As illustrated, this row is made up, in sequence of six "0"s, six "1"s, nine "0"s, nine "1"s, twelve "0"s, twelve "1"s, etc. This input stream will be Store(d) 30 and the device will Transfer The Stored Input Stream Upon Request 32.

Figure 5:
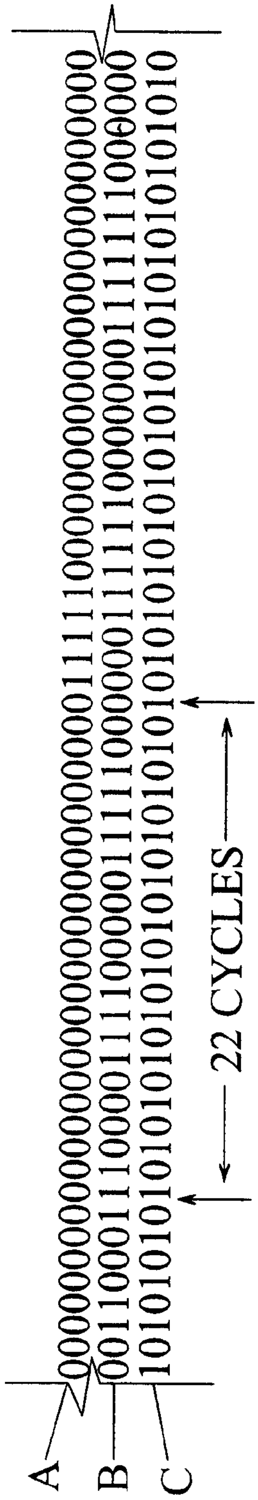
FIG. 5 is schematic illustration of memory feeding the output stream of data from an inspection device.
Figure 4:
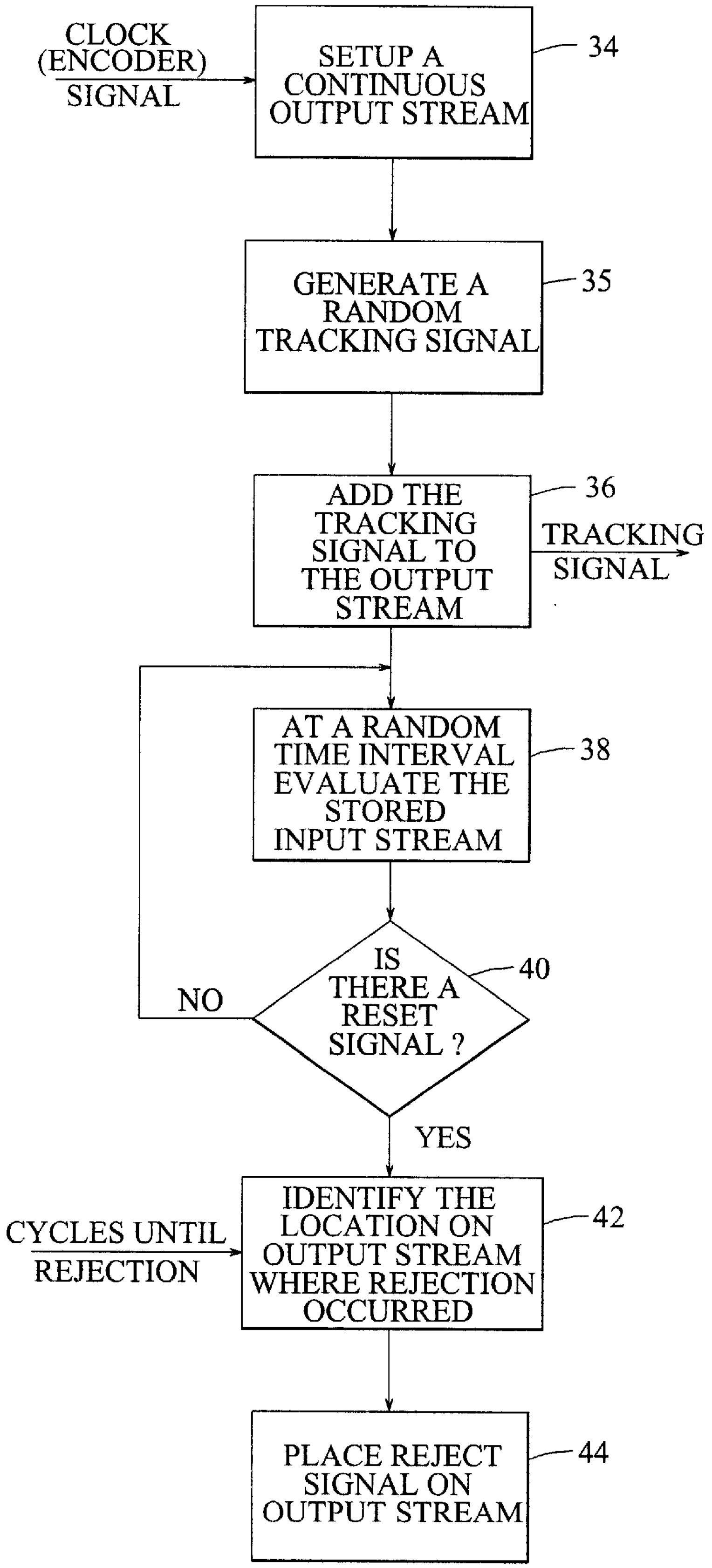
FIG. 4 is a logic diagram for the control of the inspection machine.

The inspection machine has a Control 22 which will receive the data from the inspection device and in the event a container is to be rejected, will issue a reject signal to operate a rejector 24 (here shown as a mechanical plunger which advances to push a bottle off the conveyor). This control 22 will Setup A Continuous Output Stream 34 (FIG. 4) of data which will schematically appear as shown in FIG. 5. The output stream has a bottom row clocked by the encoder, in this illustration the input stream is three times faster than the output stream and this clock will be represented by alternate "1"s and "0"s (a fraction of the number of "1"s and "0"s in the clocking groups in the input stream which corresponds to relative speeds of the input and output data streams. The top row will be zeros except when a reject signal is to be supplied to the rejector and when this happens this signal will be five "1"s in duration, for example. The middle row of data is the tracking signal, which because the speed of the input stream is three times faster than the output stream will be one third the number of "1"s or "0"s in the corresponding tracking signal in the input stream. As illustrated, this middle row is made up, in sequence of two "0"s, two "1"s, three "0"s, three "1"s, four "0"s, four "1"s, etc.

The control Generate(s) A Random Tracking Signal 35, Add(s) The Tracking Signal To The Output Stream 36 and supplies the tracking signal to the inspection device. And the control, At A Time Random Time Interval Evaluate(s) The Stored Input Stream 38. The control during this evaluation determines whether there Is There A Reject Signal 40 and if there is, will Identify The Location On The Output Stream Where Rejection Occurred 42. This is done by looking at the input stream. First the middle row, at the time that the device switched to 1 indicating that there was a rejection, clocked from 000 to 111 or converting to the output stream, this would have occurred in the output stream when the clock on the switched from 0 to 1. At this instant the input stream tracking number is nine 1's which would correspond to three 1's in the output stream. The leftmost arrow below the output stream, identifies the location on the output stream where the clock switches from "0" to "1" and the tracking number is three "1"s (where the rejection occurred) and the control knows the Cycles Until Rejection (22 in this example) and Place(s) A Reject Signal On Output Stream 44 at that time which will last for five cycles.

What is claimed is:

1. A machine for inspecting containers comprising a conveyor for transporting inspected containers, an encoder operatively associated with said conveyor, a rejector to be operated to remove a rejected container from the conveyor, an inspection device for inspecting the container upstream of the rejector, said inspection device generating a continuous input stream of data including reject signals, a control for receiving the input stream and processing said input stream at random time intervals and for generating a continuous output stream of data including reject signals to said rejector, means for enabling said control to process said input stream at random time intervals comprising means for converting the signal from said encoder to a clock signal and placing the clock signal on the input and output streams, means for generating a tracking signal and placing it on the output stream, means for placing the tracking signal on the input stream, and means in said control for evaluating the tracking signal in the input stream to determine its location in the output stream and for placing a reject signal in its correct location in the output stream.

2. A machine for inspecting containers comprising a conveyor for transporting inspected containers, a rejector to be operated to remove a rejected container from the conveyor, an inspection device for inspecting the container upstream of the rejector, said inspection device generating a continuous input stream of data including a first continuous row of data indicating by a transition from 0 to 1 that a container has been rejected, a second continuous row of data having successive identical clocking groups of 1's and 0's, and a third continuous row of data comprising a first tracking signal defined by groups of identical numbers of 1's and 0's having random counts, a control for randomly evaluating said input stream and for generating a continuous output stream of data including a first continuous row of data of alternating clocking 1's and 0's, said 1's and 0's corresponding in time to the identical groups of 1's and 0's in said second row of data of said input stream and being a selected fraction thereof, each of said 1's and 0's defining a cycle, a second continuous row comprising a second tracking signal defined by groups of 1's and 0's having said selected fraction of the 1's and 0's of said groups of 1's and 0's of said first tracking signal, and a third continuous row of data having successive 0's except for a number of 1's located to operate said rejector for a predetermined number of cycles a selected number of cycles following the location on the output stream corresponding to the time on the input stream where the data on said first row of data switched from "0" to "1".

3. A machine for inspecting containers according to claim 2, further comprising an encoder driven by the conveyor, said inspection device comprising means for converting the signal from said encoder into said second continuous row of data having successive identical clocking groups of 1's and 0's, and said control comprising means for converting the signal from said encoder to said first continuous row of data of alternating clocking 1's and 0's.

* * * * *